UNITED STATES PATENT OFFICE.

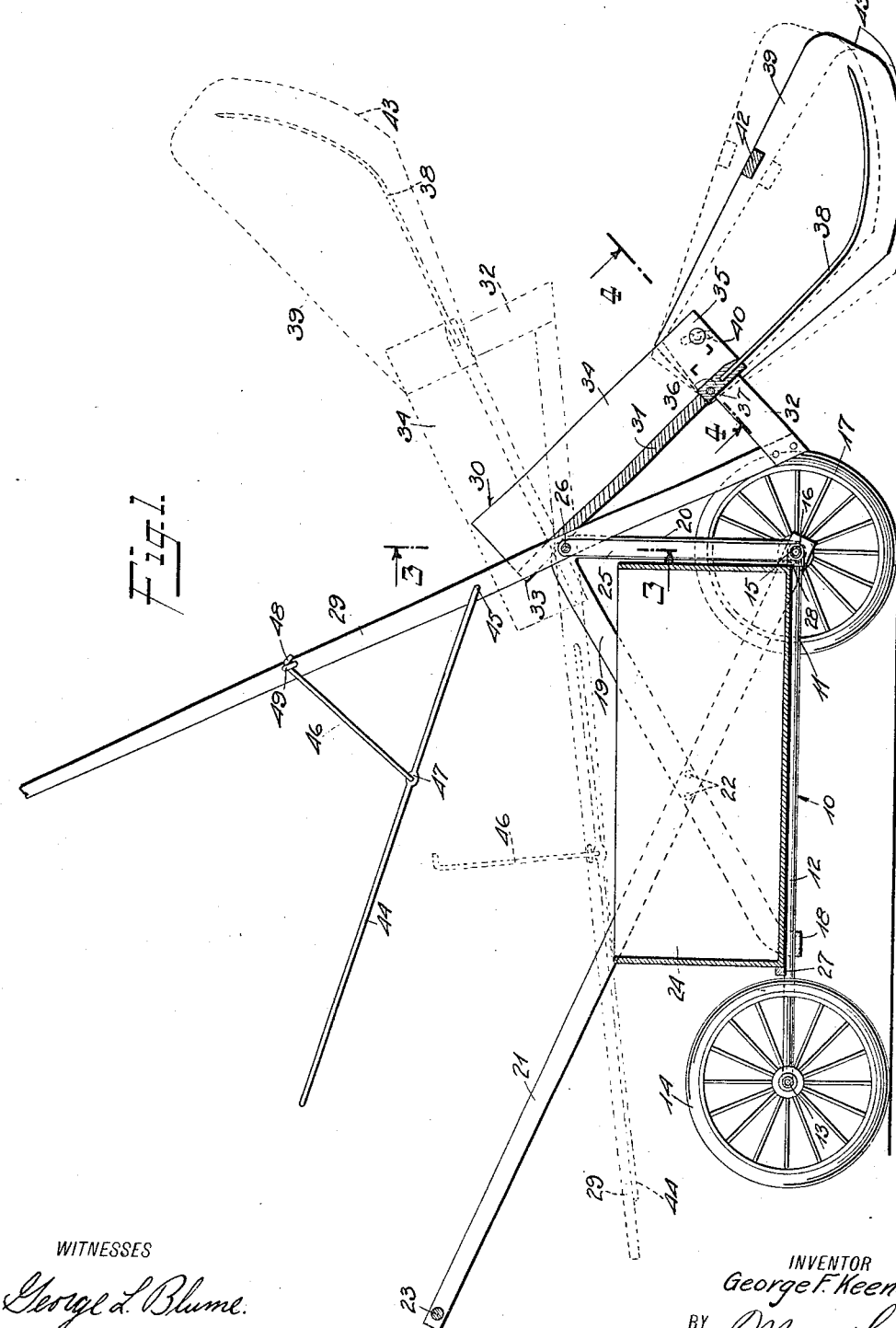

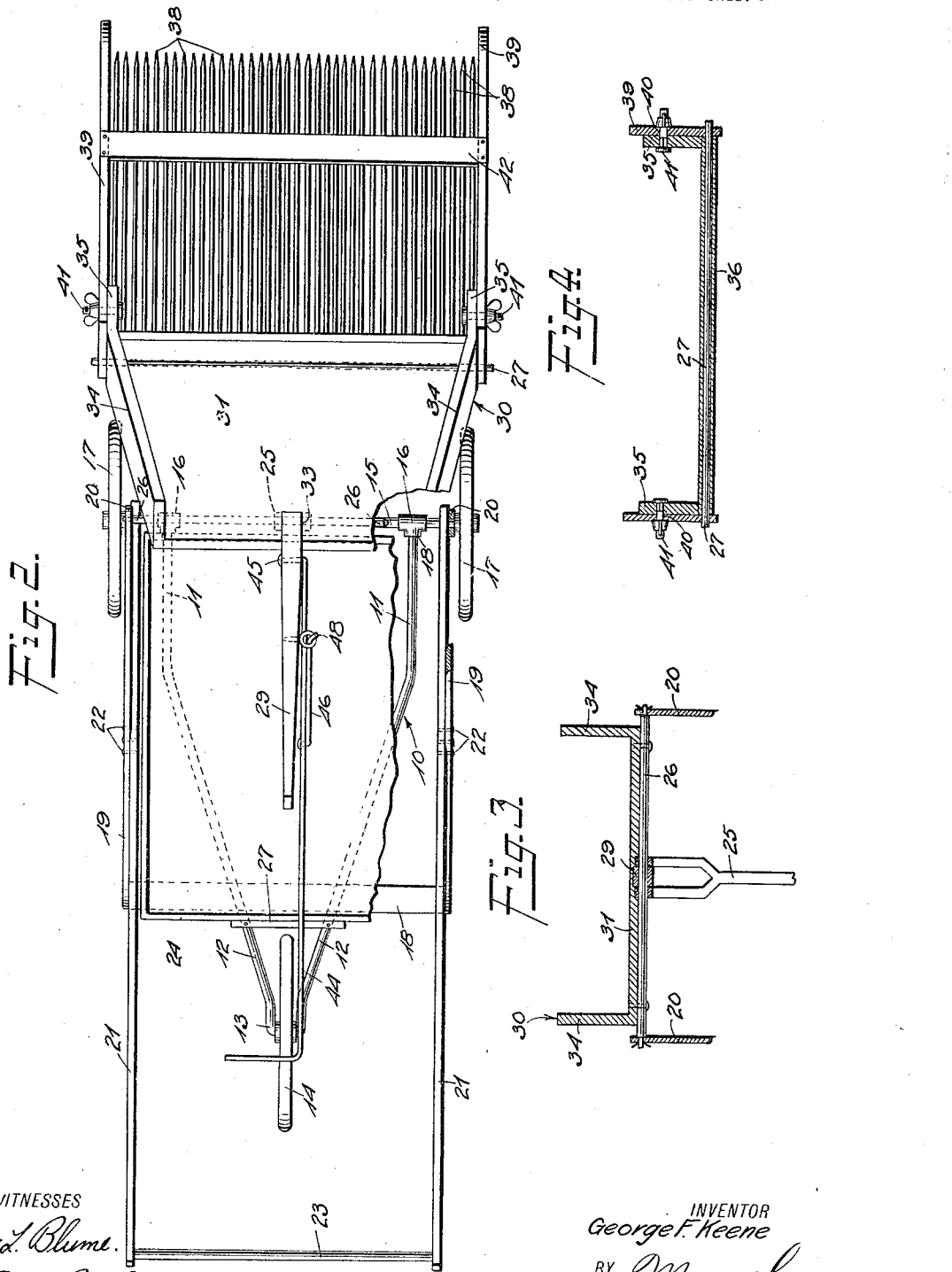

GEORGE F. KEENE, OF WHITMAN, MASSACHUSETTS, ASSIGNOR OF ONE-HALF TO ALFRED O. PARDEY, OF WHITMAN, MASSACHUSETTS.

CRANBERRY-HARVESTER.

1,143,403.  Specification of Letters Patent.  Patented June 15, 1915.

Application filed October 7, 1914. Serial No. 865,407.

*To all whom it may concern:*

Be it known that I, GEORGE F. KEENE, a citizen of the United States, and a resident of Whitman, in the county of Plymouth and State of Massachusetts, have invented a new and Improved Cranberry-Harvester, of which the following is a full, clear, and exact description.

This invention has special reference to an improved cranberry harvester or berry picking machine designed to be advanced over the ground or bog and provided with a forked or toothed scoop designed to pass under the berries with the vines passing between the teeth of the scoop so as to strip the berries therefrom and permit the same to be deposited into a berry box or receptacle removably carried upon the machine.

A further object of the invention is to provide an improved cranberry harvester which embodies a wheeled frame of novel construction which supports a cranberry box, the frame being designed to be advanced manually or otherwise and pivotally supporting a scoop designed to collect the berries during the advancement of the machine and being so constructed that the wheels of the frame will not track beyond the sides of the scoop and thereby be prevented from crushing the unpicked berries, while provision is also made to adjust the scoop sides with relation to the teeth thereof so that the teeth will operate at different distances from the ground to secure the best adjustment for most effectively harvesting the berries, and the scoop is provided with a handle to so balance it as to follow the unevenness of the ground and not scale any of the berries or dig into the ground, while at the same time allowing for the convenient elevation of the scoop to empty the berries thereof into the box.

A still further object of the invention is to provide the handle, which pivotally supports the scoop in position to compensate for the unevenness of the ground and to relieve the load thereof, with an auxiliary or lower handle which is disposed in convenient position to be grasped by the operator when the machine is advanced by hand, so as to raise the scoop for emptying the same, while the handle proper moves with respect to the auxilary handle or the two fall together until the scoop is again lowered into operative position.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Figure 1 is a vertical longitudinal sectional view of the improved cranberry harvester illustrating an embodiment adapted to be advanced by hand; Fig. 2 is a plan view thereof partly broken away; Fig. 3 is a vertical cross sectional view taken on the line 3—3 of Fig. 1; and Fig. 4 is a cross sectional view taken on the line 4—4 of Fig. 1.

As illustrated, the improved cranberry harvester or berry picking machine embodies a wheeled frame 10, the same being of substantially triangular form and having side portions 11 spaced apart in parallel relation and converging toward the rear at the inwardly directed portions 12 producing a bight portion 13 which forms an axle for rotatably journaling a single transporting or bearing wheel 14 thereon. At the front of the frame an axle 15 is provided which is secured to the extremities of the portion 11 as shown at 16, but which projects beyond such points of attachment for the rotatable journaling of a pair of transporting or bearing wheels 17 thereon in front of the bearing wheel 14 which is equidistantly positioned therebetween. The frame is thus supported at a spaced distance from the ground surface and is adapted to be advanced across the ground by suitable propelling means, such means in the present instance being illustrated as designed to permit the machine to be advanced by hand. For this purpose the frame further comprises a yoke member which may take the form of a strip with a transverse bottom portion 18 from which extend inclined side portions 19 with their forward ends highest or uppermost in a plane above the axle 15 and retained in this position by depending side portions 20 which are connected or fixed to the axle at their lower extremities outwardly of the attaching portion 16 or the sides of the frame 10.

A pair of handles 21 inclined in an opposite direction relative to the direction of inclination of the portions 19, are connected to the latter at their points of intersection therewith, as shown at 22, the handles being thus held in fixed inclined positions and having their lower extremities engaged with or connected to the axle 15 inwardly of the portions 19 and 20, as clearly illustrated in the drawings. The handles project above and rearwardly of the transporting or bearing wheel 14 and are connected by a cross piece 23 adapted to be grasped by the operator for advancing the machine, as will be readily apparent.

The frame is designed to support a receptacle or box 24, preferably a standard one bushel cranberry box when the machine is employed for harvesting cranberries for which it is especially adapted, and the box is supported upon the frame 10 and portion 18. The box is held from forward displacement by an upright 25 extending between the axle 15 and a pivot 26 connecting the upper extremities or angular portions of the sides 19 and 20 where they are bent, and from rearward displacement by a cross strip or cleat 27 connected to the converging portions 12 of the frame 10 to form a shoulder for abutment with the rear end of the box. The forward end of the box also abuts the shoulder 28 produced by the T-connections 16 to further provide against the forward displacement of the box in connection with the upright 25 which simultaneously forms a brace for the pivot 26 while the latter holds the side portions 19 and 20 and braces the same in spaced parallel relation.

Pivotally supported on the pivot 26 is a handle or lever 29, the engagement of the handle with the pivot being forward of the longitudinal center of the handle or lengthwise dimension thereof in such a manner that the greater portion of the handle is at the rear to overbalance the front portion and thus act to properly balance the gathering scoop which is supported by the handle for pivotal movement to an operative position for collecting the berries or to an inoperative position for discharging or emptying the berries into the box. This scoop embodies a chute or hopper 30 including a bottom portion 31 decreasing in width rearwardly and secured to the lower extremity of the handle or lever 29 by a connection 32 so that the upper end thereof, which is connected to and slotted as shown at 33 to receive the handle, will project over the cross connection or brace 26 of the frame which simultaneously forms a pivot for the scoop. The side portions 34 of the chute are attached to the bottom portion 31 and converge rearwardly at the same degree of convergence of the side edges of the bottom, so that the chute at its discharge end is of less width than the width of the receptacle or box 24 into which the berries are discharged and collected, as will be hereinafter more fully set forth. The sides of the chute at the front of the latter have portions 35 thereof disposed in spaced parallel relation and of such width as to dispose the same outwardly of the transporting wheels 17 so that the scoop will also be correspondingly wider and thus the wheels will not track in the unpicked berries to crush or injure the same.

Pivotally connected to the chute is the scoop proper which comprises a head 36 mounted to swing on the pivot 37 between the sides of the chute, the head being disposed in line with the bottom of the chute and having a plurality of spaced teeth 38 secured thereto by anchoring the same in the head endwise from the forward edge of the head. These teeth are preferably formed of small gage tubing having tapered or pointed extremities causing the teeth to be spaced apart a slightly greater degree at their extremities than at their major portions and being so closely positioned as to prevent the berries from escaping between the teeth. The teeth are curved upwardly at their forward ends to form a receptacle-like member for retaining the berries therein prior to their discharge into the box, but in order to cause the teeth to operate at different elevations or distances from the ground best calculated to most efficiently harvest the berries, the side portions 39 of the scoop adjacent to the parallel side portions 35 are provided with arcuate slots 40 and said side portions are mounted to swing on the pivot 37 independent of the sides of the chute and the teeth. Said side portions, in swinging in an arc of a circle concentric to the pivot 37 as a center, may be adjusted and held in the desired position by suitable clamping means consisting of bolt and nut connections 41 engaged through the parallel portions 35 of the sides of the chute and the arcuate slots 40 in the sides 39 of the scoop proper, the nuts being tightened to exert frictional engagement between the parts 35 and 39 to retain the latter against movement independently thereof. This operation is clearly illustrated in the three positions of the sides shown in Fig. 1 of the drawings, the dotted line positions indicating the sides adjusted below and above the intermediate position shown in full line to vary the elevation at which the teeth will operate.

The sides 39 are connected by a cross brace 42 to strengthen the structure and to further insure the sides moving together and thus being uniformly adjusted, it being understood that the sides of the scoop proper are similarly shaped and provided with rounded bottom and forward edges, as shown at 43, so as not to dig into the earth. Pivoted to the handle or lever 29 is an auxiliary handle 44, the point of pivotal connection 45 of the auxiliary handle with the main handle being at a point slightly above the pivot 26, and the auxiliary handle in turn having a link 46 pivoted thereto, as shown at 47, with its opposite end provided with a hook 48. The link is disposed to slide through a guide eye 49 carried by the handle 29 above the pivotal connection 45 so that when the scoop is lowered to the position shown in Fig. 1 the eye will travel over the link and be held from displacement by the hook 48.

Thus, in harvesting the berries the machine is advanced across a bog with the teeth set at the proper elevation and due to the manner in which the scoop is pivotally supported, with a slight excess of weight at the front of the scoop or the greater weight of the scoop compared with that of the handle in rear of the pivot 26 to overbalance these parts, the scoop will be permitted to ride up and down and compensate for the unevenness in the ground surface and therefore not scale any berries or dig into the ground, as will be obvious. The vines will pass between the teeth and the berries will be gathered on the same so that the continued advancement of the machine will result in the stripping of the berries from the vines when the berries come in contact with the upward sloping portions of the teeth and will drop into the hollow portion of the scoop. The vines will pass between the teeth as the machine moves ahead and the berries consequently prevented from escaping over the front of the scoop or the points of the teeth, and when the scoop is filled the operator grasps the auxiliary handle 44 and pulls down on the same. This, due to the connection of the auxiliary handle with the main handle through the medium of the link, will result in the raising of the scoop and tilting of the same at an opposite inclination when in the inoperative position shown in dotted lines in Fig. 1. As the handle 29 moves downwardly after the required pull is exerted to move the same below a horizontal position, the guide eye 49 will pass over the link 46 and the handles will be folded together with the link projecting upwardly therefrom, the berries being discharged from the scoop on to the chute or hopper and deposited or emptied into the box. Upward thrust upon the handle will result in the lowering of the scoop and the movement of the eyelet over the link to the full line position indicated in Fig. 1, when the auxiliary handle will again be in a convenient position for dumping the scoop, and this operation is continued until the box or receptacle is filled, when it is removed and a new one placed in position or the box emptied and replaced for the reception of another quantity of berries.

Having thus described my invention, what I claim as new and desire to secure by Letters Patent is:—

1. A cranberry harvester, comprising a wheeled frame, means for advancing the same, a handle pivoted between the sides of the frame at the upper forward portion of the frame, and a scoop having a discharge chute and secured to the lower end of the handle, the chute projecting at its upper end over the pivot of the handle, the scoop and its chute being tilted by said handle to discharge the berries into a suitable receptacle carried upon the frame.

2. A cranberry harvester, comprising a frame, transporting wheels arranged outside of the frame, means for advancing the frame, and a scoop pivoted to the frame and designed to gather the berries and to be tilted to discharge the same into a suitable receptacle, the scoop being of greater width than the width of the frame and having its sides disposed outwardly of the transporting wheels, whereby the unpicked berries will not be injured or crushed.

3. A cranberry harvester, comprising a carrying frame, a collecting receptacle supported thereon, a toothed scoop having a discharge chute tapering toward its discharge end and a handle pivotally supported and rigidly carrying said scoop to raise and lower the scoop over the receptacle for collecting the berries and discharging the same into the receptacle.

4. A cranberry harvester, comprising a carrying frame, a collecting receptacle supported thereon, a toothed scoop, said scoop having means to adjust the teeth thereof at varying distances from the ground and means to move the scoop to an operative position for collecting the berries when the machine is advanced across the ground and adapted to permit the movement of the scoop to an inoperative position for discharging the berries and collecting the same.

5. The combination with a wheeled frame adapted to support a receptacle, a handle for the frame to permit the manual advancement thereof, a handle pivoted to the frame, a scoop carried by the pivoted handle for pivotal movement therewith to forwardly and rearwardly inclined positions to collect the berries and empty the same therefrom respectively, said scoop being adapted to move up and down with the pivoted handle to compensate for the unevenness in the ground surface when pushed over a bog and foldable means carried by the handle for pulling rearwardly thereon to raise the scoop.

6. The combination with a wheeled frame adapted to support a receptacle, a handle for the frame to permit the manual advancement thereof, a handle pivoted to the frame, a scoop carried by the last named handle for pivotal movement therewith to forwardly and rearwardly inclined positions to colect the berries and empty the same therefrom respectively, said scoop being adapted to move vertically to compensate for the unevenness in the ground surface when pushed over a bog, an auxiliary handle pivoted to the first named handle and a link pivoted to the auxiliary handle and having slidable connection with the first named handle, whereby when downward pull is exerted on the auxiliary handle the scoop will be pivoted to discharge the contents thereof into the receptacle and whereby when the handle is moved to an overbalancing position while the auxiliary handle is held stationary it will move over the link and against the auxiliary handle with the link projecting upwardly, and means to hold the first named handle from displacement relative to the link when the scoop is lowered and the handles are elevated.

7. The combination with a wheeled frame adapted to support a receptacle, a handle for the frame to permit the manual advancement thereof, a handle pivoted to the frame, a scoop carried by the handle for pivotal movement therewith to forwardly and rearwardly inclined positions to collect the berries and empty the same therefrom respectively, said scoop being designed to pivot with the second named handle and ride over the ground to compensate for the unevenness in the ground surface when pushed over a bog, an auxiliary handle pivoted to the first named handle and a link pivoted to the auxiliary handle and having slidable connection with the first named handle, whereby when downward pull is exerted on the auxiliary handle the scoop will be raised to discharge the contents thereof into the receptacle and whereby when the handle is moved to an overbalancing position it will move over the link and against the auxiliary handle, said scoop embodying spaced curved teeth and adjustable side portions to raise and lower the teeth with respect to the ground.

8. A cranberry harvester, comprising a triangular frame with a pair of front transporting wheels and a single rear transporting wheel between the same, a frame structure attached to the first named frame and having side portions, inclined handles connected to the frames and projecting rearwardly, said frames being adapted to support a cranberry box and to hold the same against sidewise displacement, means to prevent endwise displacement of the box, a handle pivoted between the side portions of the frame structure, a rearwardly converging chute carrier thereby in front of the pivot and a scoop pivoted to the chute for vertical adjustment, the machine when advanced across a bog receiving the vines between its foraminous portions to strip the berries therefrom as the same pass by the scoop, and said handle projecting rearwardly of the pivot and forwardly and adapted to be pulled rearwardly and downwardly to raise the chute whereby the berries will be discharged from the scoop onto the chute and emptied into the box.

9. The combination with a receptacle carrier; of a scoop pivoted above and in front of the same, said scoop having a head with curved teeth connected thereto, connected side portions for said scoop having pivotal connection with the head and means to hold the sides in adjusted positions relative to the teeth and independent thereof to adjust the teeth at different elevations when in gathering position.

In testimony whereof I have signed my name to this specification in the presence of two subscribing witnesses.

GEORGE F. KEENE.

Witnesses:
HARRISON D. SOULE,
GEO. D. SOULE.

Copies of this patent may be obtained for five cents each, by addressing the "Commissioner of Patents, Washington, D. C."